United States Patent
Han et al.

(10) Patent No.: US 9,553,302 B2
(45) Date of Patent: Jan. 24, 2017

(54) ELECTRODE ASSEMBLAGE AND RECHARGEABLE BATTERY USING THE SAME

(75) Inventors: Man-Seok Han, Yongin-si (KR); Sung-Soo Kim, Yongin-si (KR); Nam-Soon Choi, Yongin-si (KR); Sae-Weon Roh, Yongin-si (KR); Jin-Kyu Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 617 days.

(21) Appl. No.: 12/947,765

(22) Filed: Nov. 16, 2010

(65) Prior Publication Data

US 2011/0177378 A1 Jul. 21, 2011

(30) Foreign Application Priority Data

Jan. 20, 2010 (KR) .................... 10-2010-0005191

(51) Int. Cl.
*H01M 4/131* (2010.01)
*H01M 4/505* (2010.01)
*H01M 4/80* (2006.01)
*H01M 4/525* (2010.01)
*H01M 10/052* (2010.01)
(Continued)

(52) U.S. Cl.
CPC ............ *H01M 4/131* (2013.01); *H01M 4/364* (2013.01); *H01M 4/366* (2013.01); *H01M 4/505* (2013.01); *H01M 4/525* (2013.01); *H01M 4/80* (2013.01); *H01M 10/052* (2013.01); *H01M 10/0585* (2013.01); *H01M 4/043* (2013.01); *H01M 2004/021* (2013.01); *Y02E 60/122* (2013.01)

(58) Field of Classification Search
CPC ...... H01M 4/131; H01M 4/365; H01M 4/366; H01M 4/505; H01M 4/80; H01M 10/052; H01M 4/043; H01M 2004/021
See application file for complete search history.

(56) References Cited

U.S. PATENT DOCUMENTS 5,705,292 A * 1/1998 Yukita et al. .................. 429/137
7,393,608 B2 * 7/2008 Cho ............................... 429/123

FOREIGN PATENT DOCUMENTS

EP      1014466    *  6/2000  ............ H01M 10/40
JP      09-92336       4/1997
(Continued)

OTHER PUBLICATIONS

KIPO Notice of Allowance dated Mar. 23, 2012, for Korean priority Patent application 10-2010-0005191, 5 pages.
(Continued)

*Primary Examiner* — Barbara Gilliam
*Assistant Examiner* — Angela Martin
(74) *Attorney, Agent, or Firm* — Lewis Roca Rothgerber Christie LLP (57) ABSTRACT

An electrode assemblage includes a first electrode assembly with first electrodes. Each first electrode has a porous first electrode current collector with a plurality of pores, and first electrode active material layers attached to the porous first electrode current collector. The electrode assemblage further includes a second electrode having a second electrode current collector and second electrode active material layers attached to the second electrode current collector, and also includes a separator disposed between the first electrode assembly and the second electrode.

18 Claims, 7 Drawing Sheets

(51) Int. Cl.
*H01M 4/36* (2006.01)
*H01M 10/0585* (2010.01)
*H01M 4/04* (2006.01)
*H01M 4/02* (2006.01)

(56) References Cited

FOREIGN PATENT DOCUMENTS

| | | | | |
|---|---|---|---|---|
| JP | 09-102328 | | 4/1997 | |
| JP | 10-027602 | | 1/1998 | |
| JP | 11-054112 | | 2/1999 | |
| JP | 2000-195501 | * | 7/2000 | ............ H01M 4/02 |
| JP | 2000-353510 | | 12/2000 | |
| KR | 10-2002-0088417 | | 11/2002 | |
| WO | WO 2009/112920 A1 | * | 9/2009 | ............ H01M 4/02 |

OTHER PUBLICATIONS

Patent Abstracts of Japan, and English machine translation of Japanese Publication 2000-195501, listed above, 15 pages.

* cited by examiner

ELECTRODE ASSEMBLAGE AND RECHARGEABLE BATTERY USING THE SAME

CROSS-REFERENCE TO RELATED APPLICATION

This application claims the benefit of Korean Application No. 10-2010-0005191, filed Jan. 20, 2010 in the Korean Intellectual Property Office, the disclosure of which is incorporated herein by reference.

BACKGROUND

1. Field

Aspects of the present invention relate to an electrode assemblage and a rechargeable battery, and more particularly, to an electrode assemblage with an improved electrode structure as well as a rechargeable battery using the same.

2. Description of the Related Art

A rechargeable battery differs from a primary battery in that the former can be repeatedly charged and discharged, while the latter only performs irreversible conversion of chemical energy to electrical energy. A small-capacity rechargeable battery is used as a power supply for small electronic devices, such as cellular phones, notebook computers, and camcorders, while a large-capacity rechargeable battery is used as a power supply for driving motors or as a power storage battery in hybrid vehicles and the like.

A large capacity high power rechargeable battery using a non-aqueous electrolyte with a high energy density has been recently developed. The large capacity high power rechargeable battery is constructed with a high power battery module having a plurality of rechargeable cells coupled to each other in series such that the battery can be used in electric vehicles requiring high power. The rechargeable battery may have a cylindrical, prismatic, or pouch shape.

With the rechargeable battery, an active material is coated on first and second electrode current collectors, or an active material sheet is laminated on the current collectors. Compared with the coated electrode, a laminated electrode may have a relatively large thickness. Further, as the contact area between the substrate and the active material layer is relatively small, when the thickness of the laminated electrode increases, the resistivity thereof also increases. With charging and discharging operations, electron transmission and ion transmission simultaneously occur, one of which may determine the charging and discharging speed. Even with a thick electrode, if the electrolyte saturation reaches equilibrium within a sufficient period of time, the speed depends upon the electron transmission reaction of the thick electrode.

In order to increase the conductivity of the active material layer, it is possible to increase the density of the mixture used for coating or to increase the content of the conductive agent. However, if the mixture density is increased, it is liable to obstruct the fluid saturation of the electrolyte, while if the conductive agent content increases, the battery capacity may be reduced.

As described above, when the thickness of the active material layer is increased so as to construct a large capacity rechargeable battery, the migration distance of electrons and ions is increased and the cell resistance is increased so that it is no longer possible for charging and discharging to be conducted at a predetermined C-rate or more.

The above information disclosed in this Background section is only for enhancement of understanding of the background of the described technology and therefore it may contain information that does not form prior art that is already known in this country to a person of ordinary skill in the art.

SUMMARY

Aspects of the described technology have been designed in an effort to provide an electrode assemblage and a rechargeable battery having advantages of charging and discharging in a stable manner even with an increase in amount of an active material.

An exemplary embodiment of the present invention provides an electrode assemblage including a first electrode assembly with first electrodes. Each first electrode has a porous first electrode current collector with a plurality of pores, and first electrode active material layers attached to the porous first electrode current collector. The electrode assemblage further includes a second electrode having a second electrode current collector and second electrode active material layers attached to the second electrode current collector, and a separator disposed between the first electrode assembly and the second electrode.

The first electrode assembly may include a plurality of first electrodes each with first electrode active material layers laminated on each side of each first electrode current collector. Two first electrode active material layers may be disposed between each first electrode current collector. When the number of first electrode current collectors contained in the first electrode assembly is indicated by a letter N, the number of first electrode active material layers contained in the first electrode assembly may be established to be 2N.

A common first electrode active material layer may be disposed between two first electrode current collectors, and the common first electrode active material layer may be larger in thickness than an outer first electrode active material layer disposed external to each first electrode current collector. The common first electrode active material layer may be double the thickness of the outer first electrode active material layer. Each first electrode active material layer may be hot-pressed against its respective first electrode current collector.

A plurality of pores may be formed in the second electrode current collector, and a second electrode assembly may be formed by electrically connecting a plurality of the second electrodes with each other while the second electrode assembly faces the first electrode assembly with the separator interposed between the first electrode assembly and the second electrode assembly.

A first active material of each first electrode active material layers may comprise a loading level ranging from about 60 mg/cm$^2$ to about 120 mg/cm$^2$ and may be attached to each side of the first current collector. The first current collector may be first coated with a mixture of a conductive agent and a binder.

At least one outer electrode assembly may be disposed at the outermost sides of the electrode assemblage. Each outer electrode assembly may include outer electrodes each with an outer current collector and outer active material layers attached on both sides of each outer current collector. The outer active material layer may be smaller in thickness than the first electrode active material layer. The outer active material layer may be half the thickness of the first electrode active material layer.

Each first electrode may include an outer active material layer disposed at the outermost side of the first electrode assembly and an inner active material layer disposed internal to the first electrode assembly, and the inner active material layer may contain more lithium manganese oxide than the outer active material layer. The inner active material layer may contain lithium manganese oxide, and the outer active material layer may contain a mixture of lithium manganese oxide, and lithium nickel cobalt manganese oxide or lithium cobalt oxide.

Another exemplary embodiment of the present invention provides a rechargeable battery including an electrode assemblage, a case within which the electrode assemblage is mounted, and terminals electrically connected to the electrode assemblage and protruding to the outside. The electrode assemblage includes a first electrode assembly with first electrodes, each first electrode having a porous first electrode current collector with a plurality of pores and first electrode active material layers attached to the porous first electrode current collector; a second electrode having a second electrode current collector and a second electrode active material layer attached to the second electrode current collector; and a separator disposed between each first electrode assembly and each second electrode.

When the number of first electrode current collectors contained in the first electrode assembly is indicated by a letter N, the number of first electrode active material layers contained in the first electrode assembly may be established to be 2N. A common first electrode active material layer may be disposed between two first electrode current collectors, and the common first electrode active material layer may be larger in thickness than the outer first electrode active material layer disposed external to each first electrode current collector. The common first electrode active material layer may be double in thickness than the outer first electrode active material layer.

Each first electrode active material layer may be hot-pressed against the respective first electrode current collector. A plurality of pores may be formed in the second electrode current collector, and a second electrode assembly may be formed by electrically connecting a plurality of the second electrodes with each other. The second electrode assembly may face the first electrode assembly with the separator interposed between the first electrode assembly and the second electrode assembly.

At least one outer electrode assembly may be disposed at the outermost sides of the electrode assemblage. Each outer electrode assembly may include outer electrodes each with an outer current collector and outer active material layers attached on both sides of the outer current collector, and the outer active material layer may be smaller in thickness than the first electrode active material layer. The outer active material layer may be half the thickness of the first electrode active material layer.

The first electrode may include an outer active material layer disposed at the outermost side of the first electrode assembly and an inner active material disposed internal to the first electrode assembly, and the inner active material layer may contain more lithium manganese oxide than the outer active material layer. The inner active material layer may contain lithium manganese oxide, and the outer active material layer may contain a mixture of lithium manganese oxide, and lithium nickel cobalt manganese oxide or lithium cobalt oxide.

With an exemplary embodiment of the present invention, the conductivity of electrons is improved so that even if the electrode thickness is increased, charging and discharging can be conducted in a stable manner. Furthermore, as the electrode thickness is capable of being increased, the number of electrodes can be optimized so that battery construction efficiency can be improved.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures. Like reference numerals designate like elements throughout the specification and drawings.

Figure 1:
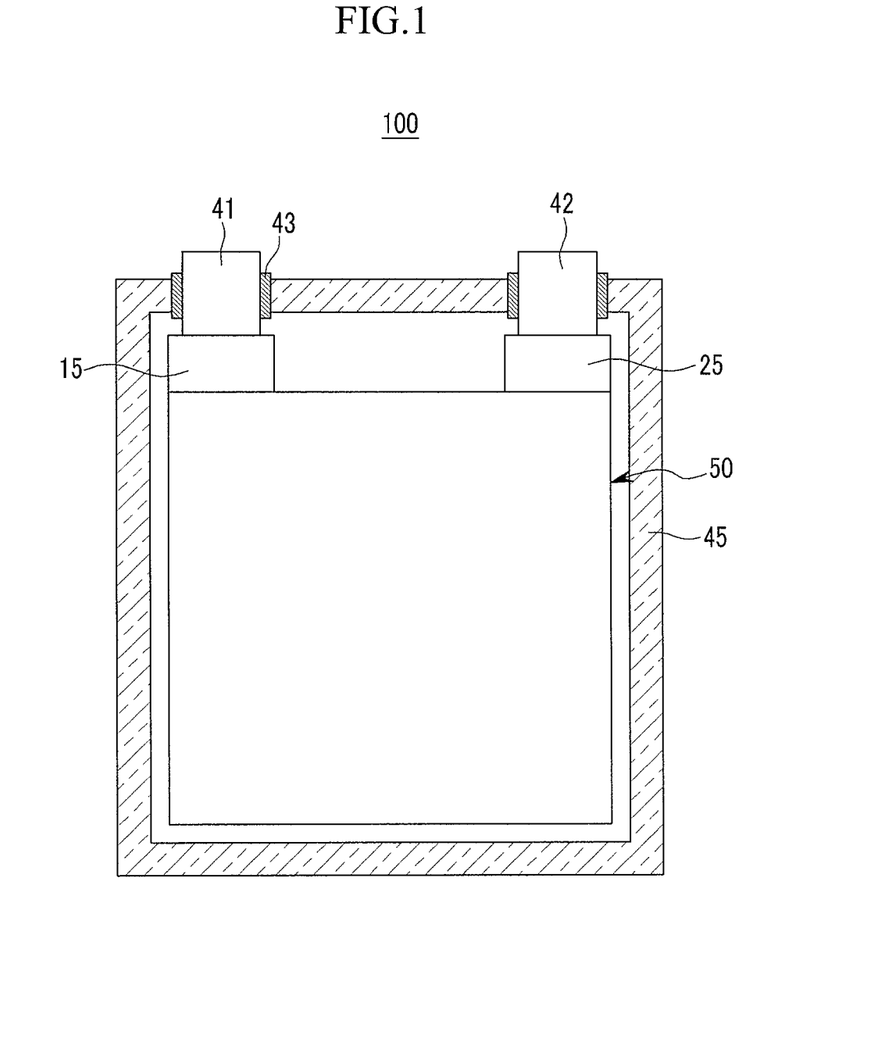
FIG. 1 is a cross-sectional view of a rechargeable battery according to an exemplary embodiment of the present invention.
Figure 2:
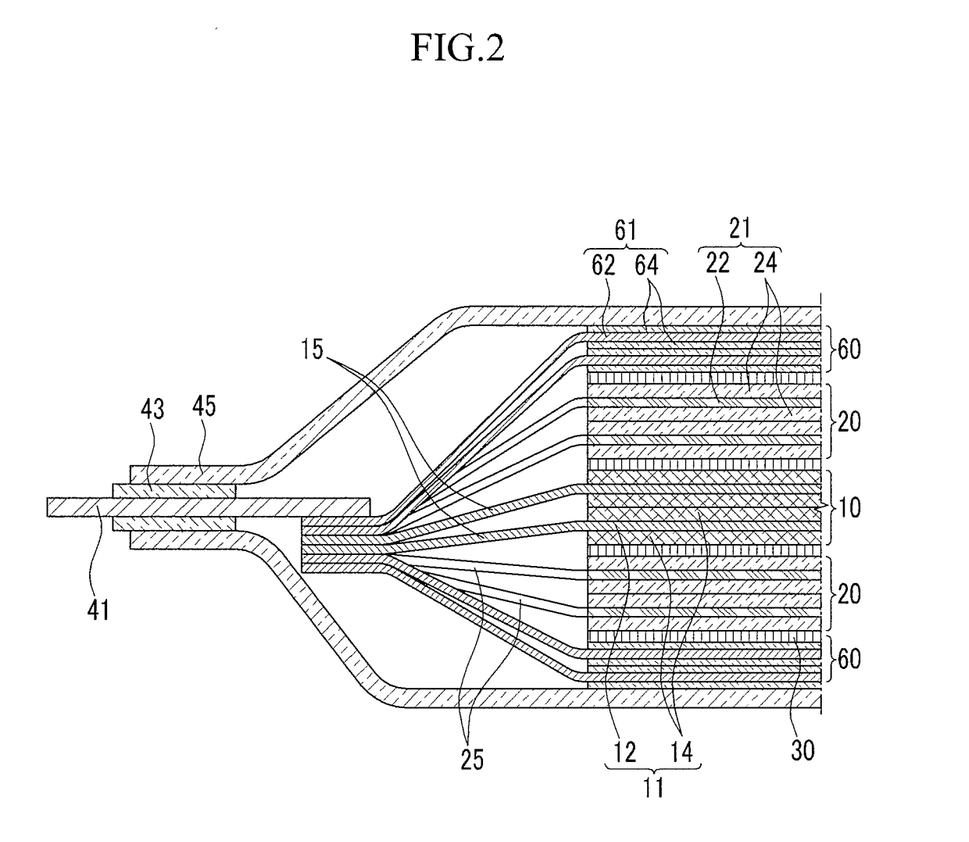
FIG. 2 is a partial sectional view of the rechargeable battery according to the embodiment of FIG. 1.

FIG. 1 is a cross-sectional view of a rechargeable battery according to an exemplary embodiment of the present invention, and FIG. 2 is a partial sectional view of the rechargeable battery according to the embodiment of FIG. 1. Referring to FIGS. 1 and 2, the rechargeable battery 100 includes an electrode assemblage 50 conducting charge and discharge operations, a case 45 within which the electrode assemblage 50 is mounted, and first and second terminals 41 and 42 electrically connected to the electrode assemblage 50.

The case 45 wholly encloses the rechargeable battery 100, and provides a space within which the electrode assemblage 50 is mounted. For example, the case 45 may be formed with a filmed pouch shape, or a rectangular parallelepiped prismatic shape having an opening at one face for receiving the rectangular parallelepiped electrode assemblage 50. The case 45 may be formed with a laminated film.

The first and second terminals 41 and 42 are electrically connected to the electrode assemblage 50, and protrude to the outside of the case 45. The first terminal 41 is electrically connected to a first electrode uncoated region 15, and the second terminal 42 is electrically connected to a second electrode uncoated region 25. A sealing member 43 is disposed between the first and second terminals 41 and 42 and the case 45 to seal the first and second terminals 41 and 42 to the case 45. In this exemplary embodiment, the first and second terminals 41 and 42 protrude from the case 45 in the same direction, but the present invention is not limited thereto. That is, the first and second terminals 41 and 42 may protrude from different faces of case 45.

As shown in FIG. 2, electrode assemblage 50 includes a first electrode assembly 10, second electrode assemblies 20, at least one outer electrode assembly 60, and separators 30 disposed between the first and second electrode assemblies 10 and 20 as well as between the second electrode assemblies 20 and each outer electrode assembly 60. More generally, the electrode assemblage 50 is structured such that at least one first and at least one second electrode assemblies 10 and 20 are alternately deposited while interposing at least one separator 30, and at least one outer electrode assembly 60 is disposed at opposite outermost sides of the electrode assemblage 50. Each first electrode assembly 10 has a plurality of first electrodes 11 overlapped with each other, and each second electrode assembly 20 has a plurality of second electrodes 21 overlapped with each other. Each outer electrode assembly 60 is formed with a plurality of outer electrodes 61 joined with each other.

In the exemplary embodiment of FIGS. 1 and 2, first and second electrodes 11 and 21 make up the electrode assemblies 10 and 20, but the present invention is not limited thereto. That is, it is possible that only one of the first and second electrodes 11 and 21 make up an assembly, and that the other electrode is formed as a single electrode.

Each first electrode 11 is structured such that first electrode active material layers 14 are attached onto each side of a first electrode current collector 12. The first electrode active material layers 14 attached to the sides of the first electrode current collector 12 have the same thickness and the same weight per unit volume.

Each first electrode current collector 12 is formed from aluminum or stainless steel and has a shape of a porous rectangular plate with a plurality of pores. The first electrode active material layer 14 is formed with a positive electrode active material and has a shape of a sheet. Accordingly, the first electrode 11 functions as a positive electrode, and the second electrode 21 functions as a negative electrode. However, the present invention is not limited thereto, and it is possible that the first electrode 11 functions as a negative electrode and the second electrode 21 functions as a positive electrode.

The active material content of the first electrode active material layer 14 amounts to about 85% or more. The active material content per unit area, that is loading level, in the first electrode 11 ranges from about 60 mg/cm$^2$ to about 120 mg/cm$^2$ at both sides thereof. If the active material content is less than 60 mg/cm$^2$, the amount of the active material cumulated per unit area is so small that the output of the rechargeable battery 100 is likely to be too low. By contrast, if the active material content exceeds 120 mg/cm$^2$, the electrode thickness is too much and the ion migration and the electron delivery times become too long such that the desired charging and discharging rate (C-rate) is not achieved.

The first electrode active material layers 14 are laminated onto each side of the respective first electrode current collector 12. A mixture of a conductive agent and a binder is pre-coated on the first electrode current collector 12. In this way, the first electrode active material layer 14 may be attached onto the first electrode current collector 12 in a stable manner.

The first electrode active material layer 14 is attached to the first electrode current collector 12 through hot-pressing. In this hot pressing, some of the first electrode active material layer 14 flows into the pores of the first electrode current collector 12 so that the first electrode active material layer 14 and the first electrode current collector 12 are more tightly attached to each other.

The first electrode active material layer 14 is not formed at the top of the first electrode 11, and the first electrode current collector 12 is therefore exposed so as to form the first electrode uncoated region 15. The first terminal 41 is fixed to the first electrode uncoated region 15 through welding.

Each second electrode 21 is structured such that second electrode active material layers 24 are attached onto each side of a second electrode current collector 22. The second electrode current collector 22 is formed with copper, stainless steel, or aluminum and has a shape of a porous rectangular plate with a plurality of pores. In the exemplary embodiment of FIG. 2, the second electrode active material layer 24 is formed with a negative electrode active material which has a shape of a sheet.

The second electrode active material layer 24 is not formed at the top of the second electrode 21, and the second electrode current collector 22 is therefore exposed so as to form the second electrode uncoated region 25. The second terminal 42 is fixed to the second electrode uncoated region 25 through welding. The second electrode active material layer 24 is attached onto the second electrode current collector 22 through laminating in a process similar to that described above.

Each outer electrode assembly 60 is disposed at the outermost opposite sides of the electrode assemblage, and includes one or more outer electrodes 61. Each outer electrode 61 is structured such that outer active material layers 64 with positive electrode properties are attached onto an outer current collector 62. The outer active material layer 64 is formed from the same material as the first electrode active material layer 14, and accordingly, each outer electrode assembly 61 functions as a positive electrode. The outer active material layer 64 is smaller in thickness than that of each first electrode active material layer 14. In the exemplary embodiment of FIG. 2, the thickness of the outer active material layer 64 is set at about half the thickness of the first electrode active material layer 14. The outer current collector 62 is formed with a mesh structure.

In the exemplary embodiment of FIG. 2, if the thickness of the outer active material layer 64 is half the thickness of the first electrode active material layer 14, the amounts of the active material layer reacted with the second electrode assembly 20 placed directly inside of the outer electrode assembly 60 are the same, and the thickness of the assemblies is therefore not needlessly large. Furthermore, if the outer current collector 62 of the outer electrode 61 is formed with a mesh structure, the outer active material layers 64 may perform the charging and discharging operations.

In the exemplary embodiment of FIG. 2, the outer active material layer 64 is half the thickness of the first electrode active material layer 14, but the present invention is not limited thereto. The outer electrodes 61 of the outer electrode assembly 60 may be half in thickness of the first electrodes 11 of the first electrode assembly 10. Even in this case, the amounts of the active material layer electrically connected to the second electrode assembly 20 placed directly inside of the outer electrode assembly 60 are the same so that the thickness of the assemblies is not needlessly large.

The separator 30 is formed with a porous material, and insulates the first and second electrodes 11 and 21 from each other while providing a path for the flow of electrons.

Figure 3:
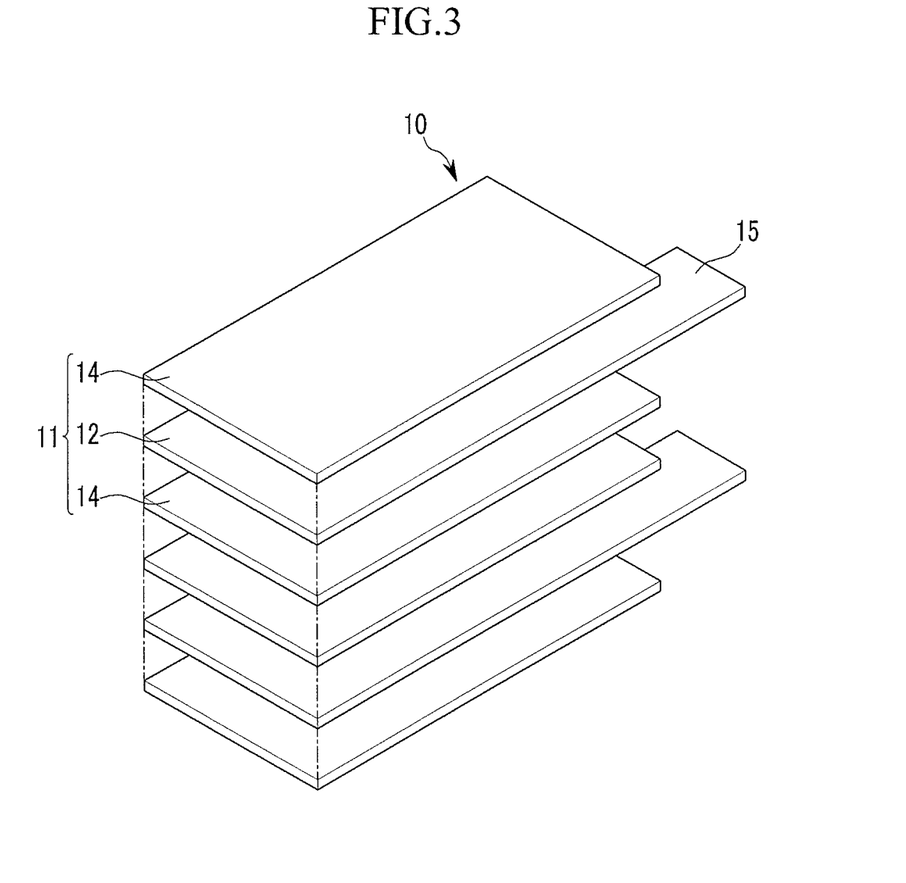
FIG. 3 is an exploded perspective view of a first electrode assembly according to the exemplary embodiment of FIG. 1.

FIG. 3 is an exploded perspective view of a first electrode assembly according to the exemplary embodiment of FIG. 1. Referring to FIGS. 2 and 3, in this exemplary embodiment, the first electrode assembly 10 has a similar structure to the second electrode assembly 20, and hence the description related to the first electrode assembly 10 need not be repeated for the second electrode assembly 20.

The first electrode assembly 10 of FIG. 3 has two first electrodes 11 adjacent to each other. However, the present invention is not limited thereto, and the first electrode assembly 10 may be formed with more than two first electrodes 11.

Two first electrode active material layers 14 are disposed between the first electrode current collectors 12, and one first electrode active material layer 14 is disposed between the first electrode current collector 12 and the separator 30 (not shown). As two first electrode active material layers 14 are disposed on the first electrode current collector 12, assuming that the number of first electrode current collectors 12 is indicated by a letter N, the number of first electrode active material layers 14 is 2N.

The first electrode active material layers 14 are arranged on each side of the respective first electrode current collector 12, and a plurality of first electrodes 11 are joined together. In this configuration, they are hot-pressed so as to form a first electrode assembly 10.

In this exemplary embodiment, when the first electrode assembly 10 is formed with a plurality of first electrodes 11, the conductivity of electrons is improved. This is because the distance between the outer surface of the first electrode active material layer 14 and the first electrode current collector 12 is reduced.

Figure 4A:
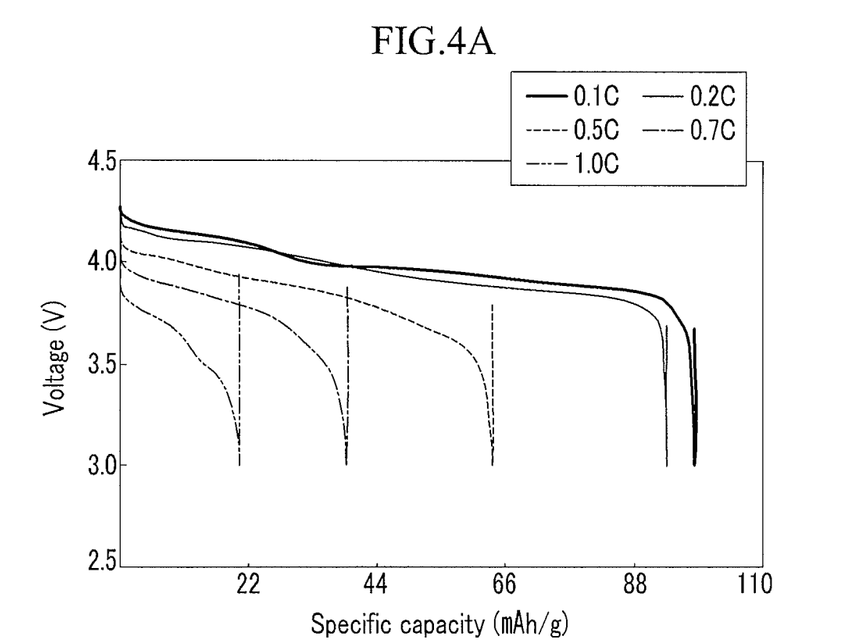
FIG. 4A is a graph illustrating voltage as a function of specific capacity in the rechargeable battery of Example 1 during discharge.
Figure 4B:
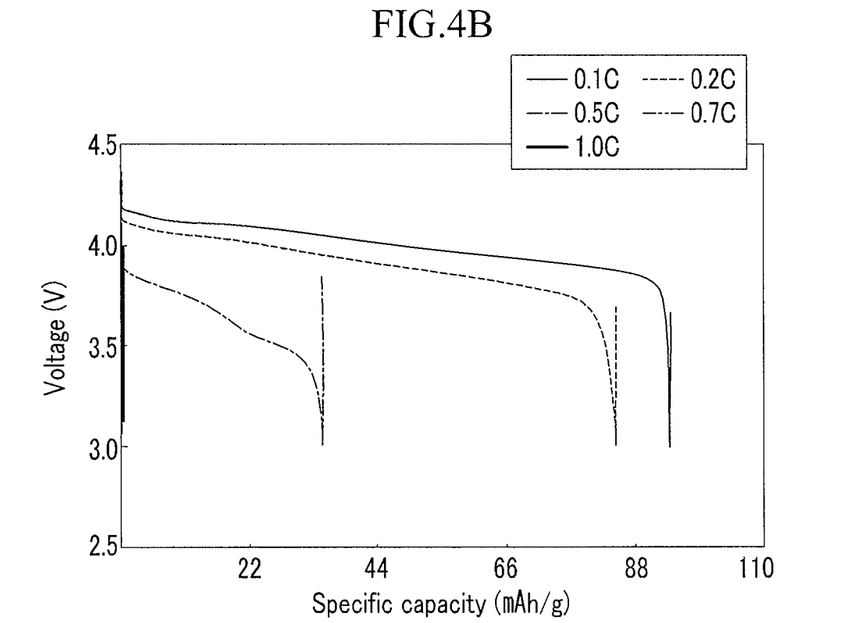
FIG. 4B is a graph illustrating voltage as a function of specific capacity in the rechargeable battery of Comparative Example 1 during discharge.

FIG. 4A is a graph illustrating voltage as a function of specific capacity in the rechargeable battery of Example 1 during discharge, and FIG. 4B is a graph illustrating voltage as a function of specific capacity in the rechargeable battery of Comparative Example 1 during discharge.

Referring to FIGS. 4A and 4B, the thicknesses of active material in the rechargeable batteries according to Example 1 and Comparative Example 1 were all 60 mg/cm$^3$. The voltage distributions were measured at 0.1 C, 0.2 C, 0.5 C, 0.7 C, and 1.0 C when discharge was measured.

As shown in FIG. 4A, with the battery according to Example 1, a good voltage characteristic was obtained, but as shown in FIG. 4B, with the battery according to Comparative Example 1, the battery problematically reached the cutoff voltage while not fully discharging at 0.7 C and 1.0 C. With the battery according to Comparative Example 1, the distance between the active material layer and the current collector was so large that the migration speed of electrons was significantly less than the discharge time of the currents applied. However, with the battery according to Example 1, where a plurality of electrodes was used in one electrode assembly, charging and discharging could be performed more stably than with that according to Comparative Example 1. In this way, with the present exemplary embodiment, even though the thickness of the active material layer is increased in order to enhance the capacity of the rechargeable battery, the charging and discharging can be conducted in a stable manner.

Figure 5:
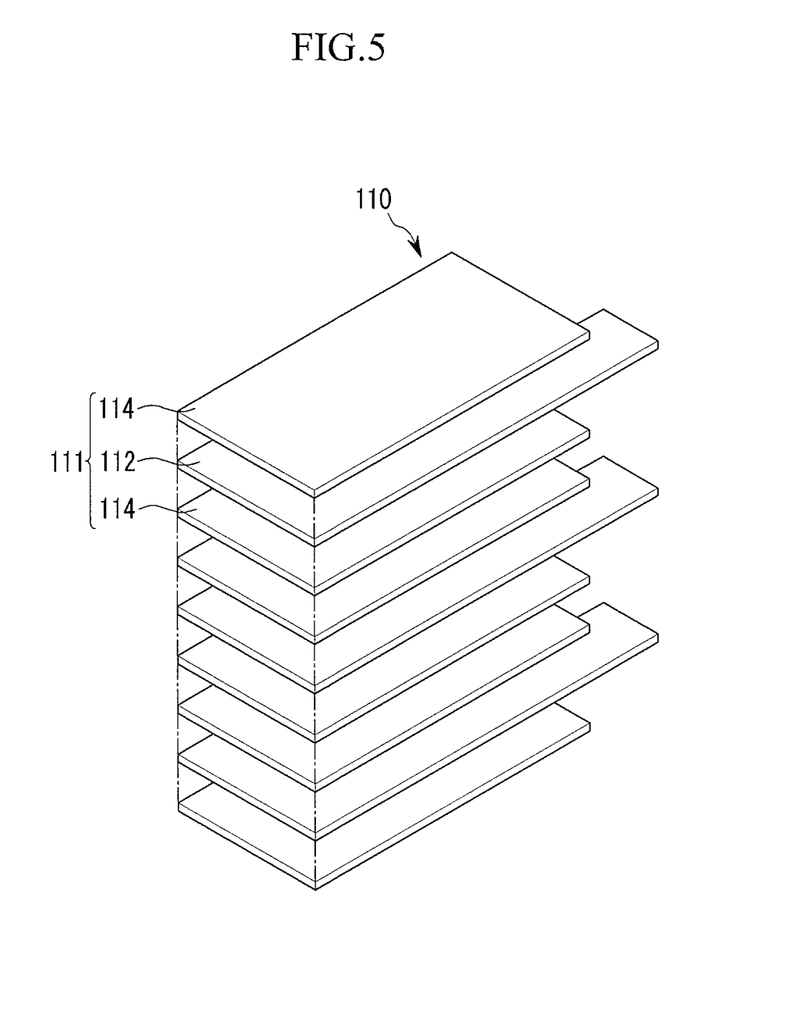
FIG. 5 is an exploded perspective view of a first electrode assembly according to another exemplary embodiment of the present invention.

FIG. 5 is an exploded perspective view of a first electrode assembly according to another exemplary embodiment of the present invention. In this exemplary embodiment, as a second electrode assembly has a similar structure as the first electrode assembly 110, the description related to the first electrode assembly 110 need not be repeated.

The first electrode assembly 110 according to this exemplary embodiment has three first electrodes 111. The first electrode 111 includes a first electrode current collector 112 and first electrode active material layers 114 attached onto each side of the respective first electrode current collector 112. Accordingly, the first electrode assembly 110 has three first electrode current collectors 112, and six first electrode active material layers 114. In this exemplary embodiment, when the first electrode assembly 110 has three first electrodes 111, it is possible to form the first electrode assembly 110 with a larger thickness, and therefore to fabricate a rechargeable battery with a larger capacity.

Figure 6:
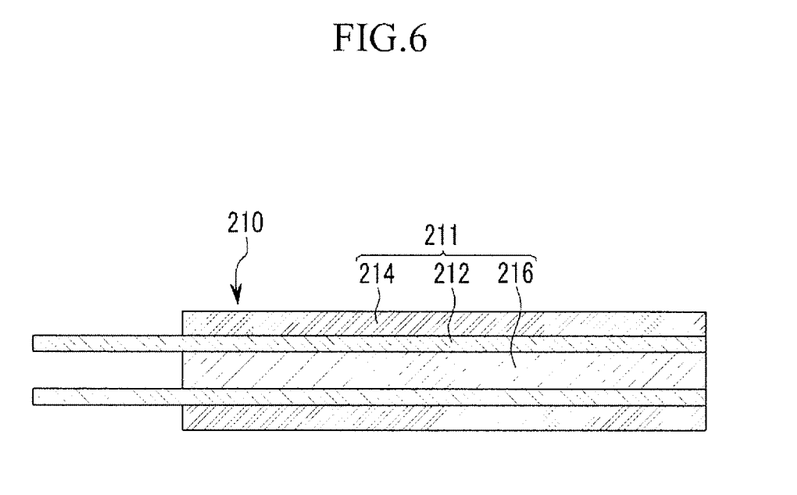
FIG. 6 is a cross-sectional view of a first electrode assembly according to another exemplary embodiment of the present invention.
Figure 7:
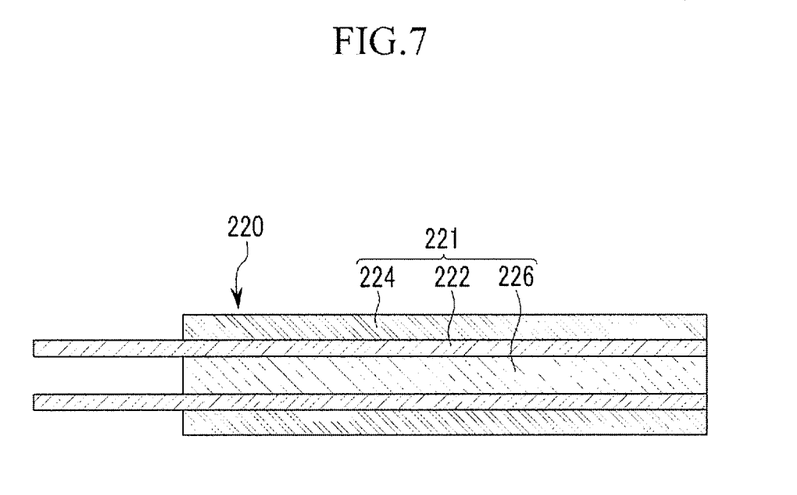
FIG. 7 is a cross-sectional view of a second electrode assembly according to the exemplary embodiment of FIG. 6.

FIG. 6 is a cross-sectional view of a first electrode assembly according to another exemplary embodiment of the present invention, and FIG. 7 is a cross-sectional view of a second electrode assembly according to the exemplary embodiment of FIG. 6. Referring to FIGS. 6 and 7, with the present exemplary embodiment, the first electrode assembly 210 includes two first electrodes 211, and the first electrode 211 includes an outer first electrode active material layer 214 disposed external to a first electrode current collector 212, and a common first electrode active material layer 216 disposed between the first electrode current collectors 212 with a larger thickness than that of the outer first electrode active material layer 214. The common first electrode active material layer 216 is shared by the first electrode neighbors 211. The common first electrode active material layer 216 is commonly possessed by the first electrode neighbors 211, and has a thickness that is double that of the outer first electrode active material layer 214.

Furthermore, a second electrode assembly 220 includes two second electrodes 221, and each second electrode 222 includes an outer second electrode active material layer 224 disposed external to a second electrode current collector 222, and a common second electrode active material layer 226 disposed between the second electrode current collectors 222 with a larger thickness than that of the outer second electrode active material layer 224. The common second electrode active material layer 226 is shared by the second electrode neighbors 221, and has a thickness that is double that of the outer second electrode active material layer 224.

In this exemplary embodiment, if the common active material layers 216 and 226 are formed, the number of active material layers can be reduced, and electrons can migrate from the active material layers 214, 216, 224, and 226 to the current collectors 212 and 222 disposed on both sides thereof, thereby conducting the charging and the discharging more stably.

Figure 8:
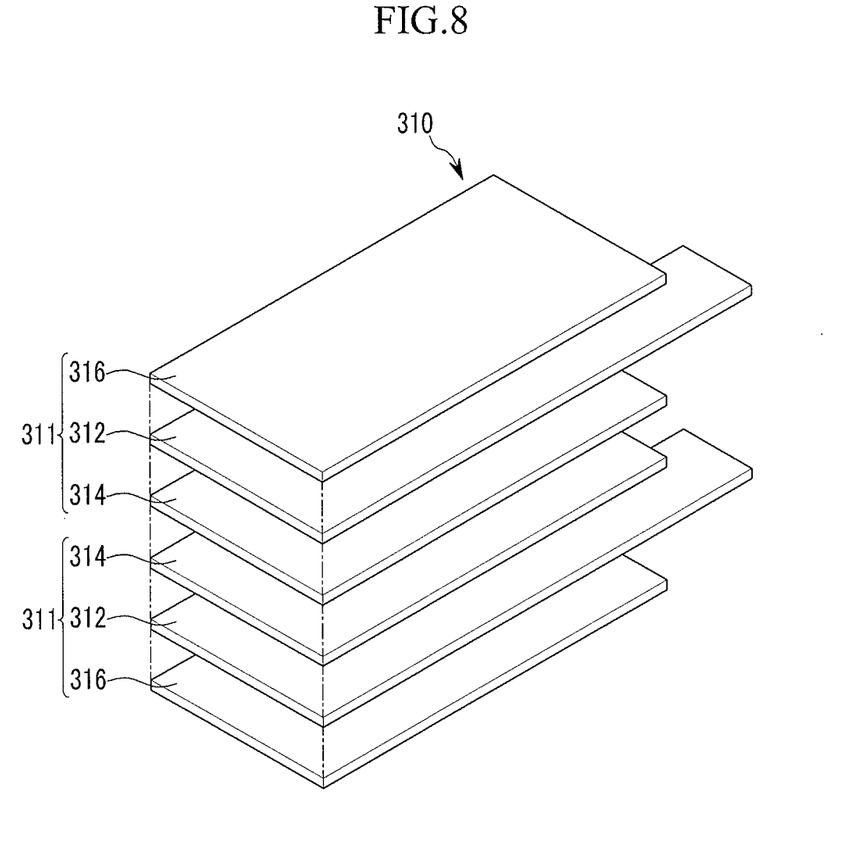
FIG. 8 is an exploded perspective view of a first electrode assembly according to another exemplary embodiment of the present invention.

FIG. 8 is an exploded perspective view of a first electrode assembly according to another exemplary embodiment of the present invention. A second electrode assembly according to this embodiment has a similar structure as the second electrode assembly according to the first electrode assembly, and the description need not be repeated.

With the present exemplary embodiment, the first electrode assembly 310 has two first electrodes 311. Each first electrode 311 includes a first electrode current collector 312, an inner active material layer 314 attached to the inner surface of the respective first electrode current collector 312, and an outer active material layer 316 attached to the outer surface of the respective first electrode current collector 312. The outer active material layers 316 are disposed at the outermost sides of the first electrode assembly 310 between the first electrode current collector 312 and the separator (not shown), while the inner active material layers 314 are disposed at the inside of the first electrode assembly 310 between the first electrode current collectors 312.

The inner active material layer 314 is formed with an active material containing lithium manganese oxide (LMO) as a main component, and the outer active material layer 316 is formed with an active material containing a mixture of lithium manganese oxide (LMO), and lithium nickel cobalt manganese (NCM) oxide or lithium cobalt oxide (LCO). Accordingly, the inner active material layer 314 contains more lithium manganese oxide than the outer active material layer 316. With the outer active material layer 316, the mixture ratio of lithium manganese oxide and lithium nickel cobalt manganese oxide or lithium cobalt oxide may be about 30% to 95%, and preferably about 40% to 90%.

If the inner active material layer 314 is formed with lithium manganese oxide, the manganese content does not easily flow from the inside thereof so that the battery performance can be prevented from deteriorating due to the outflow of manganese. Furthermore, with the usage of lithium manganese oxide, high power can be obtained and over-charge stability can be improved. Furthermore, when the outer active material layer 316 is formed with an active material containing a mixture of lithium manganese oxide and lithium nickel cobalt manganese oxide or lithium cobalt oxide, the manganese content does not flow from the outside thereof so that the performance of the rechargeable battery can be prevented from deteriorating. As described above, with this exemplary embodiment, as the lithium manganese oxide contained in the outer active material layer 316 is smaller in amount than that contained in the inner active material layer 314, the manganese content does not flow from the outer active material layer 316 while achieving the desired high power.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assemblage comprising:
    a first electrode assembly with a plurality of first electrodes, each first electrode having a porous first electrode current collector with a plurality of pores and first electrode active material layers attached to the porous first electrode current collector, wherein two first electrode active material layers are interposed between two adjacent first electrode current collectors such that one of the two first electrode active material layers contacts one of the two adjacent first electrode current collectors, the other one of the two first electrode active material layers contacts the other one of the two adjacent first electrode current collectors, and the two first electrode active material layers contact each other;
    a second electrode having a second electrode current collector and second electrode active material layers attached to the second electrode current collector, at least two of the first electrodes being at a same side of the second electrode; and
    a separator disposed between the first electrode assembly and the second electrode,
    wherein when the number of first electrode current collectors contained in the first electrode assembly is indicated by a letter N, the number of first electrode active material layers contained in the first electrode assembly is established to be 2N.

2. The electrode assemblage of claim 1, wherein the plurality of first electrodes each comprises first electrode active material layers laminated on respective sides of each first electrode current collector.

3. The electrode assemblage of claim 1, wherein each first electrode active material layer is hot-pressed against its respective first electrode current collector.

4. The electrode assemblage of claim 1, wherein a plurality of pores is formed in the second electrode current collector, and a second electrode assembly is formed by electrically connecting a plurality of the second electrodes with each other while the second electrode assembly faces the first electrode assembly with the separator interposed between the first electrode assembly and the second electrode assembly.

5. The electrode assemblage of claim 1, wherein a first active material of each first electrode active material layer comprises a loading level ranging from about 60 mg mg/cm$^2$ to about 120 mg/cm$^2$ and is attached to each side of the first current collector.

6. The electrode assemblage of claim 1, wherein the first current collector is first coated with a mixture of a conductive agent and a binder.

7. The electrode assemblage of claim 1 further comprising at least one outer electrode assembly disposed at the outermost sides of the electrode assemblage, wherein each outer electrode assembly comprises a plurality of outer electrodes each with an outer current collector and outer active material layers attached on both sides of the outer current collector, and the outer active material layer is smaller in thickness than the first electrode active material layer.

8. The electrode assemblage of claim 7, wherein the outer active material layer is half the thickness of the first electrode active material layer.

9. The electrode assemblage of claim 1, wherein each first electrode comprises an outer active material layer disposed at the outermost side of the first electrode assembly and an inner active material layer disposed internal to the first electrode assembly, and the inner active material layer contains more lithium manganese oxide (LMO) than the outer active material layer.

10. The electrode assemblage of claim 9, wherein the inner active material layer contains lithium manganese oxide, and the outer active material layer contains a mixture of lithium manganese oxide, and lithium nickel cobalt manganese (NCM) oxide or lithium cobalt oxide (LCO).

11. A rechargeable battery comprising an electrode assemblage, the electrode assemblage comprising:
    a first electrode assembly with a plurality of first electrodes, each first electrode having a porous first electrode current collector with a plurality of pores and first electrode active material layers attached to the first electrode current collector, wherein two first electrode active material layers are interposed between two adjacent first electrode current collectors such that one of the two first electrode active material layers contacts one of the two adjacent first electrode current collectors, the other one of the two first electrode active material layers contacts the other one of the two adjacent first electrode current collectors, and the two first electrode active material layers contact each other, a second electrode having a second electrode current collector and second electrode active material layers attached to the second electrode current collector, at least two of the first electrodes being at a same side of the second electrode, a separator disposed between the first electrode assembly and the second electrode;

a case within which the electrode assemblage is mounted; and terminals electrically connected to the electrode assemblage and protruding to the outside, wherein when the number of first electrode current collectors contained in the first electrode assembly is indicated by a letter N, the number of first electrode active material layers contained in the first electrode assembly is established to be 2N.

12. The rechargeable battery of claim 11, wherein when the number of first electrode current collectors contained in the first electrode assembly is indicated by a letter N, the number of first electrode active material layers contained in the first electrode assembly is established to be 2N.

13. The rechargeable battery of claim 11, wherein each first electrode active material layer is hot-pressed against the respective first electrode current collector.

14. The rechargeable battery of claim 11, wherein a plurality of pores is formed in the second electrode current collector, and a second electrode assembly is formed by electrically connecting a plurality of the second electrodes with each other while the second electrode assembly faces the first electrode assembly with the separator interposed between the first electrode assembly and the second electrode assembly.

15. The rechargeable battery of claim 11, wherein the electrode assemblage further comprises an outer electrode assembly at the outermost side of the electrode assemblage, and the outer electrode assembly comprises a plurality of outer electrodes each with an outer current collector and outer active material layers attached on both sides of the outer current collector, while the outer active material layer is smaller in thickness than the first electrode active material layer.

16. The rechargeable battery of claim 15, wherein the outer active material layer is half the thickness of the first electrode active material layer.

17. The rechargeable battery of claim 11, wherein each first electrode comprises an outer active material layer disposed at the outermost side of the first electrode assembly and an inner active material layer disposed internal to the first electrode assembly, and the inner active material layer contains more lithium manganese oxide (LMO) than the outer active material layer.

18. The rechargeable battery of claim 17, wherein the inner active material layer contains lithium manganese oxide, and the outer active material layer contains a mixture of lithium manganese oxide, and lithium nickel cobalt manganese (NCM) oxide or lithium cobalt oxide (LCO).

* * * * *